Patented Apr. 13, 1926.

1,580,487

UNITED STATES PATENT OFFICE.

HARRY M. HEIMERDINGER, OF BLACKFOOT, IDAHO.

BAKING PROCESS.

No Drawing.   Application filed October 21, 1925. Serial No. 63,864.

*To all whom it may concern:*

Be it known that I, HARRY M. HEIMERDINGER, a citizen of the United States, and resident of Blackfoot, county of Bingham, and State of Idaho, have invented certain new and useful Improvements in Baking Processes, of which the following is a specification.

My present invention relates to the baking of bread and the like. The object of the improvements is to shorten the time required for the completion of the operation and to obtain a product of great superiority as to keeping qualities, nutritive value, ease of assimilation, and low manufacturing cost.

In order to attain these results, I employ, either alone or in conjunction with the wheat flour or other ingredients used for making the bread or the like, a suitable proportion of a flour or powder produced from the interior or pulp portion of potatoes or other starchy, or leguminous or farinaceous vegetables (sweet potatoes, beans, corn, pumpkins, yams, peas, lentils, etc.) I might use for this purpose, the flour mentioned at the end of the description of Letters Patent of the United States No. 1,295,160 granted to me on February 25, 1919; but for the best results I prefer to employ an improved comminuted product obtained from the interior or pulp portion of vegetables of the type mentioned, by a new method which I have devised. For the sake of completeness, I will here describe, as an example, the manner of producing this improved comminuted product from white potatoes, it being understood that an analogous procedure would be employed in the case of other vegetables of the type mentioned. After washing, the white (Irish) potatoes, in an unskinned condition, are boiled, preferably (although not necessarily) under pressure in a sealed receptacle at a temperature at or above the normal boiling point of water at the locality where the manufacture is carried out: this boiling is continued until the vegetable is thoroughly cooked, whereby the skin of the vegetable is brought to a filmy condition. The cooked vegetable is then, while hot, transferred to a container having a rigid wall provided with perforations. In this container, the cooked vegetable is subjected to pressure so as to force the pulp of the potatoes through said perforations, the filmy skin and the eyes which do not pass through the perforations, being thus separated from the extruded pulp. The latter contains all the valuable constituents of the original food material, including the vitamins; more particularly, the pulp portions immediately under the skin, which are very rich in vitamins and other desirable ingredients, are made available by this treatment. In order to further improve the results obtained, I keep the material wet while it is being forced through the perforations of the container; preferably this is done by continuously supplying water to said container as long as the cooked potatoes are being forced through the perforations, the water supply being in a definite proportion to the amount of pulp. It will be understood that the water is supplied on the same side of the perforated wall as the vegetable, so that the pulp and the water will pass together through the perforations. This not only extracts and preserves some of the ingredients adhering to the skin, but keeps the material from clogging the apparatus by sticking to the perforated wall or other parts thereof, and facilitates the discharge of the skin and other matter separated from the pulp, as well as the passage of the pulp through the perforations. The pulp is in a colloidal condition.

The mixture of pulp and water discharged from the container is delivered to a receptacle provided with an agitator of any suitable construction, to produce a suspension or slurry of uniform appearance. By means of a screen or the like, this slurry is freed from any undesirable matter. The slurry, purified as just mentioned, is then pumped or otherwise delivered to a spraying and drying apparatus. For this purpose, I prefer to employ apparatus in which a whirling spray, produced by a rotary nozzle, projects the material (in this case, the slurry) by centrifugal action toward the peripheral portion of a chamber within which a current of hot air is caused to flow, the spray extending within and across such current. In my treatment, the hot air may have a temperature ranging, for instance, from 500 to 600° F. The hot air dries the spray, the moisture leaving the apparatus with the hot air, while the potato product, which is dry before the spray comes in contact with the walls of the drier, is collected in a suitable part of the apparatus, as very fine whitish particles or granules. The size of these granules may be controlled by an appropriate choice of the temperature and pressure employed in the drier and of the structure adopted for the spray-nozzle.

The resulting product contains from 5 to 8% of water, altered starch (that is, starch which has been converted at least partly into dextrin and sugar by the diastase present in the vegetable), a relatively high proportion of yeast food substances such as proteins and mineral salts, among them a large percentage of potassium phosphate. Its constituents will act as enzyme activators in fermentation and allied processes, and also as catalysts in such processes.

The powder differs very markedly from so-called potato flour produced by other processes. In particular, its power of holding or absorbing water is much greater, that is, the new powder may be mixed with a larger proportion of water than the potato flour, without objectionable stickiness. Such product is in a physical condition which enables it to be mixed readily, and it does not form lumps.

Owing to the high temperature employed during drying, the product obtained is sterile. It is a practically non-hygroscopic powder which will keep dry and serviceable for months even when freely exposed to the air. Packing, shipping, and storing of this product are thus simplified greatly.

In using this powdered product for the making of bread, I prefer to employ a certain amount (by weight) of the product to replace a like amount of the wheat or other cereal flour which forms the main constituent of the dough. For instance, if a certain type of bread is normally made with 100 pounds of wheat flour, I may use 3 pounds of my powdered potato product and reduce correspondingly the amount of wheat flour employed, that is to say, to 97 pounds. Generally speaking, the proportion of potato powder to wheat flour will be about between the limits of .5 to 100 and 35 to 100.

The mixing may be performed in any suitable manner, and the treatment of the dough, including the steps of fermenting, punching (compacting), rolling, dividing, proofing, and baking, may follow substantially the usual practice, except that considerably more water than usual will be employed in forming the dough (a substantial increase in the amount of water being necessary as the potato product absorbs many times its weight of water), and that the fermentation period may be shortened by about 20 to 30%, or from 3¼ or 3½ hours to 2¾ or 3 hours. Also, one less punching operation than usual will suffice.

The shortening of the treatment is of some importance in securing greater economy of operation, particularly as regards reducing the overlapping of shifts. The main advantages of my present invention, however, reside in the saving effected in the cost of material employed, and especially in the high quality of the resulting product. While the potato powder (which contains about from 5 to 8% of water) is non-hygroscopic, it can be mixed with relatively large amounts of water, and the dough employed in baking bread according to my present invention preferably contains up to 68 or 70% of water figured as bakers do; such dough is not sticky, but extremely mobile and therefore worked (agitated) readily as well as transferred with ease from and to pans, conveyors, and other parts of the usual bread-making machinery.

The high percentage of protein contained in the potato powder or similar powder enables me to use relatively low-grade and therefore comparatively cheap wheat flour (or other cereal flour) as the main ingredient of the bread or other baked food product. This protein will form envelopes or "bags" to hold the gas which arises from the mass during fermentation. Fermentation is also assisted by the fact that the potato powder has a high content of yeast-food substances such as proteins, mineral salts, etc. The dilution of the wheat gluten by the non-glutinous substance of the potato powder enables the yeast employed to get more readily at the wheat gluten and thus further assists the processes incident to and accompanying fermentation. The potassium phosphate content of the potato powder is also beneficial.

The potato powder, by virtue of its various constituents, acts as an enzyme activator, and a catalyst, the catalytic effect increasing the gas-producing activity of the enzymes.

On account of the higher percentage of water contained in the dough, bread made according to my present invention is heavier, for the same weight of flour. The proofing operation progresses more rapidly than with the usual standard dough. During the baking operation proper, the bread loses weight more slowly than in the usual practice, and as the expansion in the baking oven is greater than usual, it follows that, for the same weight, loaves, etc. made according to my present invention are of greater volume than the ordinary loaves etc.

The bread thus made will keep in good condition at last twice as long as usual bread. The potato powder, while constituting a relatively small proportion of the body employed for the dough, is valuable not only on account of its beneficial effects described above, but furthermore in view of its own nutritive properties and of the pleasant taste it imparts to the bread. The keeping qualities of the improved bread are due in part to its unusually high water content, and in part to the stable character of the potato powder, which will not mold, nor is it attacked by weevils. Since the potatoes, and particularly the potato powder employed by me, have an alkaline reaction with the digestive juices of the body, their presence is very desirable, since all other foods are liable to produce acid reactions which at times are harmful. The superior qualities of the bread or other baked product made according to this invention are due to the peculiar properties of the special starchy substance employed, derived from potatoes or equivalent vegetables. This potato powder or like vegetable substance is in a very stable form, owing to the fact that it is sterilized, and also on account of the presence of phosphates and other mineral salts, the effect of which is to prevent molding of the bread or other baked product. These mineral salts are of very great importance, and as they are contained in the cortical layers of the potatoes or equivalent vegetables, it is essential that the peels or cortical layers of such vegetables be present at the time of the washing and extruding treatment, since peeling or similar operations will remove such valuable mineral salts.

Various modifications may be made without departing from the nature of my invention as defined by the appended claims.

It will be understood that my present invention is not restricted to the baking of bread, but includes the making of other products such as for instance biscuits, crackers, sweet yeast raised goods, rolls, cookies, cakes, pies, or waffles, wherever a dough or batter is employed. While generally the dough or batter will contain some wheat flour or other cereal flour in addition to the potato product, this is not absolutely essential.

I claim:

1. That improvement in the making of bread and the like which comprises incorporating in the dough a comminuted product comprising the cooked and dried pulp portion of a farinaceous vegetable, said product containing from about 5 to 8% of water and a high proportion of yeast food substances.

2. That improvement in the making of bread and the like which comprises incorporating in the dough a nonhygroscopic comminuted product consisting of the cooked and dried pulp portion of a farinaceous vegetable and containing a relatively high proportion of water and protein.

3. That improvement in the making of bread and the like which comprises incorporating in the dough a nonhygroscopic comminuted product consisting of the cooked and dried pulp portion of potatoes and containing 5 to 8% of water, and free from the skins and eyes of the potato.

4. That improvement in the making of bread and the like which comprises incorporating in the dough a nonhygroscopic comminuted product consisting of the cooked and dried pulp portion of a farinaceous vegetable and containing a relatively high proportion of water, altered starch, proteins, and capable of absorbing a large amount of water.

In testimony whereof I have hereunto set my hand.

HARRY M. HEIMERDINGER.